(No Model.)  2 Sheets—Sheet 1.
R. L. DOWNTON,
SCRUBBING AND DRYING MACHINE FOR FLOORS, &c.
No. 533,413. Patented Jan. 29, 1895.
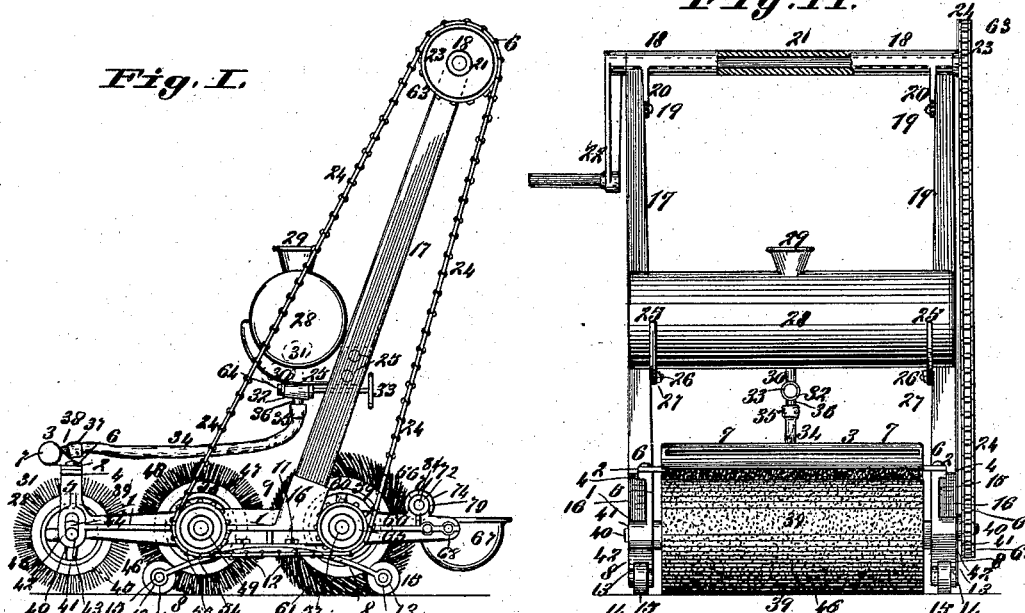
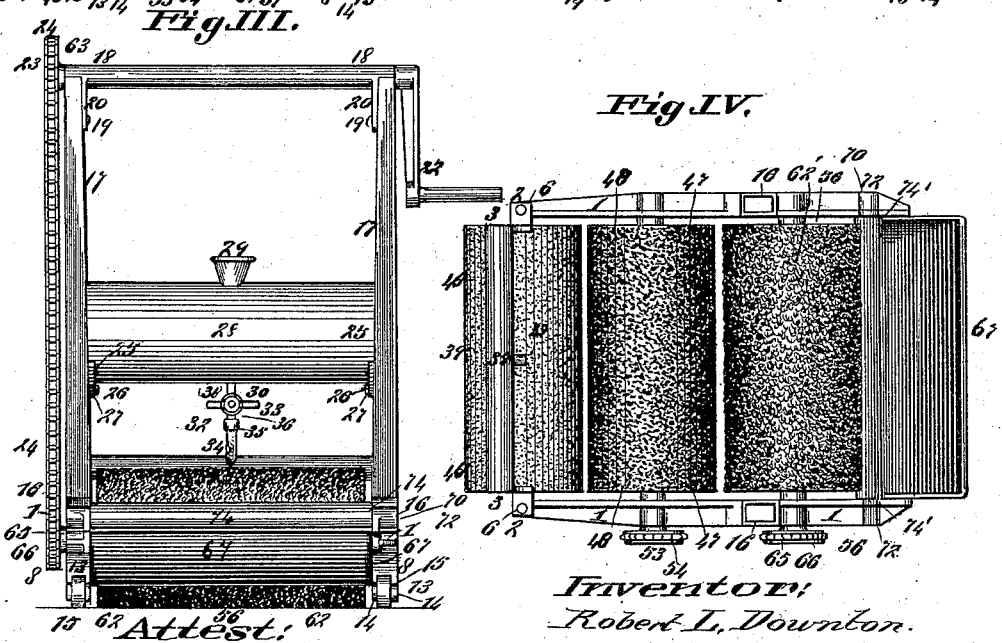
Attest:
Benj. A. Knight
Albert W. Ebersole
Inventor:
Robert L. Downton.
By Knight Bro's.
att'ys.

(No Model.) 2 Sheets—Sheet 2.
R. L. DOWNTON,
SCRUBBING AND DRYING MACHINE FOR FLOORS, &c.
No. 533,413. Patented Jan. 29, 1895.
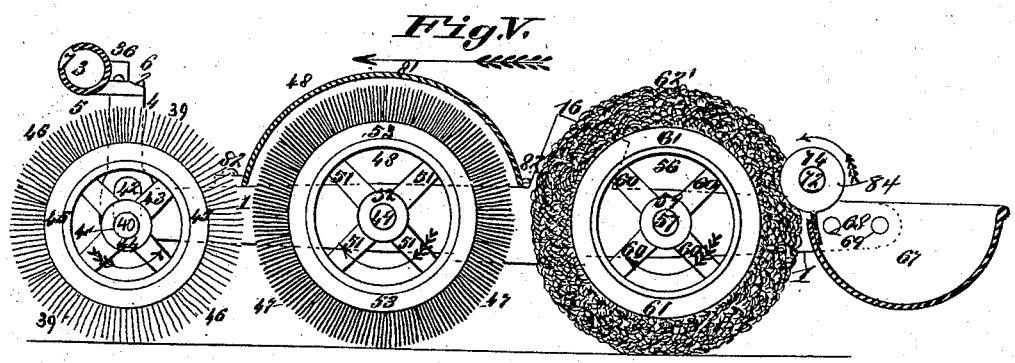
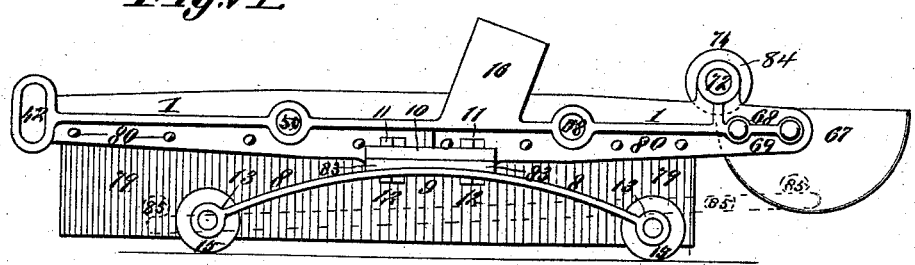
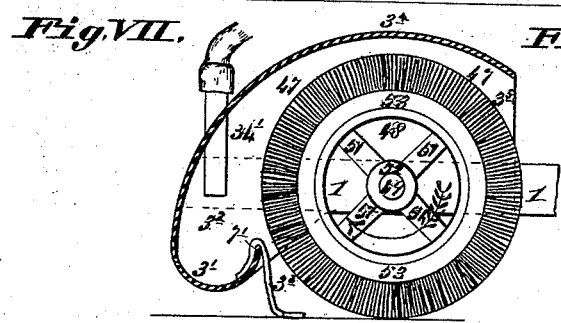
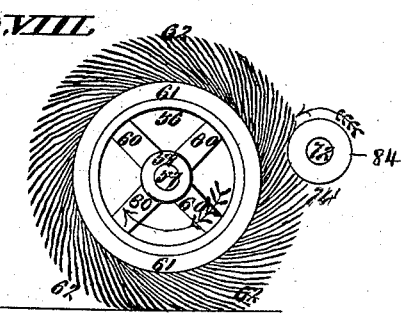
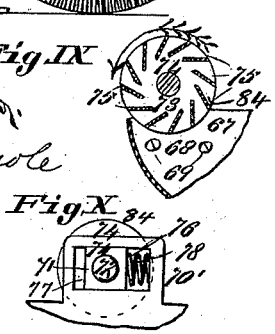
Attest:
Wm. A. Knight
Albert M. Ebersole
Inventor:
Robert L. Downton.
By Knight Bros.
Atty's.

United States Patent Office.

ROBERT LUCAS DOWNTON, OF PITTSFIELD, ILLINOIS, ASSIGNOR OF ONE-THIRD TO MARY ANN DURAND, OF ST. LOUIS, MISSOURI.

SCRUBBING AND DRYING MACHINE FOR FLOORS, &c.

SPECIFICATION forming part of Letters Patent No. 533,413, dated January 29, 1895.

Application filed February 11, 1893. Serial No. 461,994. (No model.)

*To all whom it may concern:*

Be it known that I, ROBERT LUCAS DOWNTON, of Pittsfield, in the county of Pike and State of Illinois, have invented a certain new and useful Improvement in Scrubbing and Drying Machines for Floors, &c., of which the following is a full, clear, and exact description, reference being had to the accompanying drawings, forming part of this specification.

This invention relates to a traveling scrubbing and drying machine, which has a combination frame that runs on casters, which frame in its journal bearings, carries a rotary water, suds or other liquid distributer in front, succeeded by a rotary scrubbing brush roller, which is again succeeded by a rotary absorbent roller, which laps up the dirty liquid from the floor, with a spring wringer roll at the rear of said absorbent roller, that wrings the the moisture from the same and discharges it into an adjacent trough; the said scrubbing and absorbent rollers being rotated by means of a crank handle that works a chain and sprocket attachment to the journals of said rollers; and the invention consists in features of novelty hereinafter fully described and pointed out in the claims.

Figure I is a side elevation of my preferred form of the machine, and shows the carrier frame on its casters, the elevated liquid tank, the rotary distributer, the scrubbing brush roller, my preferred form of the absorbent roller furnished with trailer absorbent fibrous strips, the wringer roll, and the operative chain sprocket attachment. Fig. II is a front elevation of the same, and shows the hand crank sprocket chain attachment that works the rolls, the liquid distributing roller, the liquid tank, conveyer pipe, and the overflow trough that discharges on the distributing roll. Fig. III is a rear end elevation, and shows the sprocket drive attachment, the absorbent roller having a modified peripheral mop of sponge, the spring roll wringer, that extracts the dirty liquid from the absorber, and the trough into which said dirty liquid is wrung. Fig. IV is a detail, side view, and shows the distributing and scrubbing rollers and a modification of the absorbent roller, in which sponge is used as the absorbent medium in the place of the fibrous medium otherwise used; and it also shows the overflow liquid distributing trough, the wringer roll and the dirty liquid trough. Fig. V is an enlarged, detail, vertical section, and shows the distributing roller, the overflow liquid trough, the scrubbing roller, a shield over said roller to arrest the splattering of liquid, the sponge mop modification of the absorbent roller, the wringer roll and the dirty liquid trough. Fig. VI is an enlarged, detail side view, and shows a splasher shield that is secured to and hangs pendent from the main journal carrier frame, and arrests the splashings from the rollers. Fig. VII is an enlarged, detail view of a modification, in which the distributing roller is dispensed with, and a modified form of the overflow liquid trough is placed at a lower level, and hangs pendent from the frame to which it is secured, close adjacent to the scrubbing roller, the said overflow trough having secured to it the trail web that distributes the liquid, and shows a surmounting splatter shield and the pendent end of the liquid conveyer pipe. Fig. VIII is an enlarged, vertical section of the preferred form of my absorbent roller, shown in Fig. I, and shows the absorbent radial and fibrous mop strips on its periphery and the wringer roll at its rear. Fig. IX is an enlarged, vertical section of a diverse form of the wringer roll, and shows its counter lap wringer paddles, with a detail of the dirty liquid trough, into which it deposits its wringings; and Fig. X is an enlarged, detail view of the rear of the frame, and shows a modified spring tension journal box in which the journal of the wringer runs.

Referring to the drawings:—1 represents the side journal bearer bars of the frame of the machine, which bars are coupled together in front by the perforate attachment lug flanges 2 of the overflow liquid trough 3, which flanges are secured to the perforate top flanges 4 of the pedestals 5 that surmount the front ends of the side bars, by the screw bolts or rivets 6.

When speaking of liquid and its appliances it is to be understood that sometimes suds is preferred, especially for use on floors and other like indoor work, where the dirt or stain is set and difficult to dislodge, but in most cases where the dirt is easily dislodged, and in out door pavement scrubbing (if it should sometimes be desired to use the machine in such places) to save expense, water may be used. Indeed the operation of the rotary scrubber is so effective that with the use of water alone to aid the dislodgement of dirt from the floor, in almost all cases said floor may be very thoroughly cleansed.

In some cases when preferred alkalies or other penetrating substances may be infused in the water used. In all cases whether water, suds or alkali or other infusion is used, the word liquid is meant to describe and cover the application of any such fluid.

The overflow liquid trough 3 in cross-section form, is shaped like an inverted letter C, or said letter turned round, and is provided with an overflow slot 7, which extends in front of said trough from end to end in the form of the intervening space between the projecting horns of said letter C.

8 represents curvilinear spring carrier bars, the perforate apex 9 of which are secured to the uniformly perforate and laterally projecting hanger flanges on the outer, lower sides of the side bars 1, by screw-bolts 11, and screw-nuts 12. 13 are duplex round journal bearer loops at each of the lower ends of said carrier bars, in which bearer loops the journals 14 of the casters or traveler wheels 15 have their bearings, as they travel with the machine they carry.

16 represents semi-vertical, integral socket pedestals that surmount the side bars 1, and present on an inclination slightly rearward. 17 are standards that are seated in said sockets and in consequence of said inclined socket seats said standards also present slightly rearward to their summits, so as to facilitate the handling of the machine by the operator. 18 represents tie bearer tubes, which extend from summit to summit of said standards, to which standards said tie tubes are secured by screw bolts 19, which pass through the perforate ends of the integral lugs 20 that hang pendent from said tie bearer tube and are screw seated in near the summits of said standards. 21 represents a round windlass shaft, which has bearings in said tie tube 18, on one end of which shaft the crank handle 22 that works the machine is secured, and on the other end thereof, the sprocket drive wheel 23 is secured, which drive wheel is provided with peripheral sprocket teeth 63. 24 is a drive elongated link chain that embraces said sprocket teeth by which said chain is driven. 25 represents concave brackets, the perforate attachment ends of which are secured to the insides of said standards 17 by the screw-bolts 26 and nuts 27. 28 represents the liquid tank, that is supported on and sits snugly in the concave beds of said brackets, and 29 is the funnel supply mouth that surmounts and delivers into said tank, through which the liquid is passed in filling the same. 30 represents a valve supply tube stem, that has a water tight seat 31 in the bottom of said tank, and 32 is a transverse conical tubular valve bed attached to said tube stem in which is sealed and works the adjustable faucet 33, which is held to its adjustment by the set-nut 64. The said faucet lets on, regulates and closes the flow of liquid from said tank into the flexible pipe or hose 34, which hose connects by its upper joint 35 to the discharge stem 36 of said faucet, and by its lower hose joint 37 to the supply port tube 38 of the aforesaid liquid overflow trough 3.

39 represents the distributing roller, the journal shaft 40 of which runs in bearings 41, in the vertically elongated bearing slots 42, in the forward ends of the side journal bearer arms 1, and in the feet of the pedestals 5 at the front ends of said side bars, with which they are integral. 43 represents cross-arms or spokes that diverge from the hubs 44, that are mounted on said journal shaft 40 of said roller 39, and 45 is the drum mounted in said spokes. 46 are the distributing bristles that are mounted in and radially diverge from said drum. The said distributing bristles that dispense the liquid, as also the friction bristles 47, of the rotary scrubbing brush roller 48 that works immediately behind said distributer, may be of any suitable material either hog's bristles or of any stiff and strong fibrous material, or even may be steel or other metallic bristles, which may largely depend on the general condition of the floor or surface on which the machine is intended to operate. 49 represents the journal-shaft of said scrubbing roller, which is mounted in the journal bearings 50 in said side bars 1 of the main frame. 51 are the cross-bars or spokes that project radially from the hubs 52 of said roller, which hubs are mounted on said journal-shaft and 53 is the drum mounted on said spokes in which drum the said friction bristles 47 of the scrubbing brush roller 48 are secured, and project radially therefrom. 54 is a sprocket wheel that is fast mounted on the projecting end of said journal-shaft 49 outside the side bar and 55 are the sprocket teeth that project radially from said sprocket wheel. 56 represents an absorbent roller, the journal-shaft 57 of which is mounted in the journal bearings 58 in said side bars. The hubs 59 of said absorbent roller are mounted on said journal-shaft 57, and on the cross arms or spokes 60 that project radially from said hubs the drum 61 of said absorbent roller is mounted. 62 represents strips of felt or other absorbent material, which are securely attached to said drum 61 in the preferred form of my absorbent roller 56, shown in Figs. I and VIII, and said strips overlap and maintain a loose convolute position in relation to each other, and are of sufficient length so that the lower ones for the time being trail along the wet floor immediately behind the scrubbing brush roller and constitute a mop to lay up or absorb said moisture, which is elevated around said absorbent roller in the direction shown by the arrows in Figs. V and VIII.

65 represents a sprocket wheel, that is fast mounted on the projecting end of the journal shaft 57 and 66 are sprocket teeth that project radially from the periphery of said wheel. The elongated links of the drive chain 24 engage with the teeth of the sprocket drive wheels 23, 54 and 65, so that when the crank 22 is turned the said sprocket wheels and the rollers they drive are operated thereby.

67 represents the waste trough which is secured by the screw bolts 68 to the rear ends of the aforesaid side arms 1 of the machine. The said bolts pass through bolt holes 69 in said side arms and through the ends of the trough and thereby both securely attach said trough and hold and brace the rear end of said frame. 70 represents journal bearer pedestals that surmount the said side arms 1, near their rear ends and in the bearings 71 of said pedestals the journals 72 of the shaft 73 run. On said shaft is mounted the cylinder wringer roll, which may be a solid round roll 74', as shown in Figs. III, and IV, or it may be and is in my preferred form a skeleton roll 74, as shown in Fig. IX, in which the end disks 84 mounted in said shaft 73 are connected by interior, eccentrically inclined paddles 75, which reach from end to end of said roll.

In Figs. I, V, and VI, the end of the wringer roll, (as far as said roll is concerned) is alone shown, therefore the said end of the roll which bears a like appearance in both its preferred and modified forms, is a correct representation of the end of the skeleton wringer roll 74 which indicating mark it bears, and is also a true representation of the end of the solid modified wringer roll. The said paddles are so placed that when in contact with the absorbent appendage or mop of said absorbent roller, the inner edges of said paddles, the outer edges of which are for the time being pressing and wringing out the moisture from the peripheral mop of said absorbent roller, said inner edges are inclined at a lower level than said outer edges and consequently the dirty liquid as it is wrung from said absorbent roller runs toward the interior of the wringer roll, to prevent its dribbling. It will also be seen that as the wringer-roll is turned by its contact pressure on said rotary absorbent mop in the direction of the arrow, as shown in Fig. IX; when the out edges of the paddles 75 individually pass the brim edge of said waste trough 67, the balance of their inclination becomes reversed downward, for then said out edge drips direct into said waste trough. The square abutting edges of said paddles against the absorbent mop of said roller effect a much more thorough wring than could a round roll without said paddles, and at the same time the ever changing by its rotation of the peculiar inclination of said eccentrically inclined paddles both aid the wringing and prevent the objectionable dribbling of the dirty liquid outside the brim of the waste trough. The said wringer roll in both its preferred skeleton paddle pressure form, and in its modified solid form in either case have their bearings sufficiently close to the absorbent roller, to wring the most of the moisture therefrom, which waste water or suds drops or flows into the waste trough ready to receive it. The said liquid runs from the paddles in the preferred form of said wringer, and in the solid modified form, the liquid which is dammed back by the extreme pressure of said solid wringer roll against said absorbent roll, overflows the wringer roll and runs down into the waste trough behind it. The said trough is of sufficient length to effectively catch said overflow.

76 represents slotways that are provided in a modification 70' of the pedestals 70, in which slotways are seated, the sliding journal bearer boxes 77, in the bearing 71 in which journal-boxes the journals 72 of the wringer roll have bearings; and 78 are spiral springs that are housed within said slot ways 76, and which effect spring tensions against said sliding journal boxes, so as to effect an elastic give and take spring pressure of the wringer roll against the peripheral mop surface of the absorbent roller.

79 represents pendent shields that are secured to the side bars 1 of the main frame by bolts or rivets 80. The said shields arrest the splashing from the scrubbing brush roller and from the absorbent roller.

81 represents a surmounting drum shield over the scrubbing brush roller, that is secured by the bolts 82 to the side arms 1; and which shield arrests the upward splashing from said scrubbing brush roller.

62' represents a modification of the peripheral mop 62 of the absorbent roll, in which modification, as shown in Figs. III, IV and V, sponge is used in the place of trailing felt strips as the mop or absorbent medium of said roller 56.

3' represents a modification of the overflow liquid trough shown in Fig. VII, which instead of surmounting the distributing roller as in the preferred form shown in Figs. I, II, IV and V, it hangs pendent by means of brackets $3^2$ that secure it to the side bars 1 immediately in front of the scrubbing brush roller 48, and a pendent extension 34' of the conveyer hose 34, provides the liquid from the tank 28 for the supply of said overflow trough.

$3^3$ represents a trailing flap of suction felt, the initial end of which is secured within the overflow trough and its pendent and trailing distributing end, hangs over the overflow rim 7' of said trough and trails on the floor immediately in front of the scrubbing brush roller 48. A drum anti-splasher shield $3^4$ integral with said trough and surmounting the same, rises over the scrubbing brush roller and incases in the same, the ends $3^5$ of which drum are secured to the side arms 1 of the frame.

83 represents perforate washer plates of which there may be a number of various thicknesses for insertion between the perforate summits 9 of the spring carrier bars 8, and the uniformly perforate lateral hanger flanges 10, so as by the adjustable thickness of said intermediate perforate washer to regulate the degree of elevation of the scrubbing and absorbent rollers and their consequent pressure on the floor.

85 represents a transfer pipe that connects with the waste trough 67, and runs forward and discharges the water or other liquid on the floor in front of the scrubbing brush roller when it is required to use said wash over again.

I claim as my invention—

1. In a scrubbing machine the combination of the journal bearer side bars of the frame, the curvilinear spring carrier bars 8, having the duplex bearer loops 13, the traveler wheels 15 journaled in said loops, the perforate washer plates 83, the perforate hanger flanges 10 that project from said side bars, the attachment screw nut bolts 11, the distributer roller 39, the scrubbing brush roller 48 and the absorbent roller; substantially as described.

2. In a scrubbing machine, the combination of the journal bearer side bars 1, the distributing roller 39, scrubbing roller 48, and absorbent roller, said rollers journal mounted in said side bars, the waste-trough 67, attached to said side bars, the spring carrier bars 8, the wheels 15, that mount said carrier bars, the standards 17, the liquid supply tank 28, the overflow trough 3, the hose 34, the wringer roll, and the eccentric inclined paddles 75; substantially as described.

3. In a scrubbing machine, the combination of the frame, the distributing roller 39, scrubbing roller 48 and absorbent roller journal mounted in said frame, the waste trough 67, the journal bearer pedestals 70, provided with the slotways 76, the journal bearer boxes 77, slide seated in said slotways, the wringer roll journals mounted in said journal boxes, the eccentric inclined paddles in said boxes, and the spiral tension springs 78, that work in said slotways; substantially as described.

4. In a scrubbing machine, the combination of the journal bearer side bars 1, the standards 17, the liquid supply tank 28, the overflow trough 3, the hose 34, the roller 39, having the distributing bristles 46, the scrubbing roller 48, having the friction bristles 47, the absorbent roller having the peripheral sponge mop, the waste trough 67, the wringer roll, the eccentric, inclined paddles 75, the sliding journal box 77 and the tension spring 78; substantially as described.

5. In a scrubbing machine, the combination of the journal bearer side-bars 1 of the frame, the scrubbing roller 48, and the absorbent roller, journal mounted in said side-bars, the waste-trough 67, the wringer roll and the transfer return liquid pipe 85, substantially as described.

6. In a scrubbing machine, the combination of the journal bearer side bars 1, provided with their triple roller bearings, namely the vertically elongated bearings 42, and the bearings 50 and 58, the self-adjusting distributing roller, the scrubbing roller and the absorbent roller, the journals of which are respectively mounted in said triple bearings, the adjustable curvilinear spring carrier bars 8, and the caster wheels 15 on which said side journal bearer bars are mounted, the rearwardly inclined sockets 16, the rearwardly inclined standards 17 seated in said sockets, the curvilinear brackets 25 attached to said standards; the liquid supply tank 28 seated on said brackets, the pedestals 5 and the overflow trough 3 mounted on said pedestals, substantially as described.

ROBERT LUCAS DOWNTON.

In presence of—
J. C. HARD,
ANGIE L. CONKRIGHT.